(12) United States Patent
Goodier et al.

(10) Patent No.: US 6,343,896 B1
(45) Date of Patent: Feb. 5, 2002

(54) PRESSURE CONTROL SYSTEM FOR PNEUMATIC OFFLOAD

(75) Inventors: Peter C. Goodier, Goshen; James M. Canary, Louisville, both of KY (US)

(73) Assignee: Syltone Industries, LLC, Louisville, KY (US)

( * ) Notice: Subject to any disclaimer, the term of this patent is extended or adjusted under 35 U.S.C. 154(b) by 3 days.

(21) Appl. No.: 09/587,633

(22) Filed: Jun. 5, 2000

(51) Int. Cl.[7] .................................................. B60P 1/60
(52) U.S. Cl. ............................ 406/43; 406/34; 406/198
(58) Field of Search .............................. 406/34, 42, 43, 406/192, 198, 115.13, 115.26; 137/906

(56) References Cited

U.S. PATENT DOCUMENTS

| | | | | |
|---|---|---|---|---|
| 2,261,364 A | * | 11/1941 | Grove | 50/21 |
| 2,511,494 A | * | 6/1950 | Cohen | 230/18 |
| 3,714,953 A | * | 2/1973 | Solvang | 137/14 |
| 5,580,193 A | * | 12/1996 | Battle et al. | 406/41 |
| 5,694,975 A | * | 12/1997 | Eidsmore | 137/489.5 |
| 5,758,683 A | * | 6/1998 | Cook | 137/115.26 |
| 5,937,895 A | * | 8/1999 | Le Febre et al. | 137/494 |
| 6,196,246 B1 | * | 3/2001 | Folsom | 137/2 |

* cited by examiner

Primary Examiner—Donald P. Walsh
Assistant Examiner—Jose Dillon, Jr.
(74) Attorney, Agent, or Firm—Christopher C. Dremann

(57) ABSTRACT

A pressure control system for accurately controlling the pressure of the air in a discharge line during a pneumatic offload includes a blower, a supply of pressurized air and a pressure relief valve. The blower directs a stream of air into the discharge line to produce a positive air pressure. The pressure relief valve includes a valve body defining a hollow valve chamber, a valve positioned within the valve chamber and a valve seat opposite the valve. The valve chamber of the pressure relief valve is in fluid communication with the discharge line through a first inlet port and in fluid communication with the supply of pressurized air through a second inlet port that receives air from the supply of pressurized air. The valve chamber of the pressure relief valve is also in fluid communication with the ambient atmosphere through at least one outlet port. Accordingly, the pressure relief valve vents the air in the discharge line to the ambient atmosphere when the pressure of the air in the discharge line exceeds the pressure from the supply of pressurized air. One or more pressure regulators may also be provided to regulate the pressure of the supply of pressurized air and at least one solenoid valve may be provided to select one of the pressure regulators in response to a predetermined operating condition. The pressure control system may also include a controller for automatically activating and initializing the pressure control system from a remote location.

9 Claims, 2 Drawing Sheets

PRESSURE CONTROL SYSTEM FOR PNEUMATIC OFFLOAD

CROSS REFERENCE TO RELATED APPLICATION (none)

FIELD OF THE INVENTION

The invention relates generally to a pressure control system for a pneumatic offload. More particularly, the invention relates to a pressure control system for accurately controlling the air pressure in a discharge line during a pneumatic offload of a dry bulk good from a tank truck.

BACKGROUND OF THE INVENTION

A dry bulk good, for example cement powder or plastic pellets, is often loaded into the tank of a tank truck and transported from the manufacturer to a customer. At the destination, the dry bulk good is unloaded from the tank utilizing a pneumatic offload process. The dry bulk good, also referred to herein as the product, is offloaded from the tank truck through a discharge line attached to a coupler provided on the underside of the tank. A blower positioned upstream of the coupler is used to initiate, facilitate and expedite the pneumatic offload process. Specifically, the blower directs ambient air into the discharge line, and thereby produces a positive pressure in the discharge line. The positive pressure of the air in the discharge line moves the product out of the tank through the discharge line to a receptacle, such as a silo, for receiving the dry bulk good.

Accurate control of the pressure of the air in the discharge line is required to optimize and maintain the flow of the product through the discharge line. If the pressure of the air in the discharge line is less than the optimum pressure, the time required to offload the product from the tank will be excessive or the product may plug the discharge line. A slow offload is inefficient and results in increased operating costs to the manufacturer and the customer. A plug in the discharge line requires manpower and results in down time to clear the discharge line and to restart the pneumatic offload process, which likewise results in increased operating costs to both the manufacturer and the customer. If the pressure of the air in the discharge line is greater than the optimum pressure, the back pressure in the discharge line can damage the blower, resulting in unnecessary manpower, expense and down time to remove and replace the blower. The product may also be damaged if the temperature or the velocity of the air in the discharge line becomes excessive during the pneumatic offload process.

As a result, the operator of the tank truck must pay careful attention to the pressure of the air in the discharge line. The pressure of the air is primarily a measure of the amount of restriction to the flow of the product through the discharge line. As such, the pressure of the air in the discharge line is a function of several variables including the operating speed of the blower, the temperature of the air in the discharge line, altitude, and the velocity of the air in the discharge line (i.e., the rate at which the product flows through the discharge line). Tank trucks are typically equipped with pressure gauges to assist the operator to monitor the pressure in the discharge line. However, if the operator does not continuously monitor the pressure gauges during the pneumatic offload process, or if any of the gauges provides a false reading, the time required to complete the offload process can be unacceptably extended, the blower can be damaged or the product can be compromised, as previously described. At present, the operator of the tank truck attempts to control the pressure of the air in the discharge line by constantly monitoring the pressure gauges, adjusting the operating speed of the blower and diverting the airflow of the blower into the tank truck or discharge line or venting the airflow to the ambient air through the blowdown line. However, the operating speed of the blower is relatively constant. Thus, adjusting the speed of the blower is an insufficient method of accurately controlling the pressure of the air in the discharge line.

In an attempt to protect the blower from damage, most tank trucks are equipped with a valve, commonly referred to as a "pressure relief valve," for relieving the air pressure in the discharge line. The pressure relief valve relieves the air pressure in the discharge line by venting the air in the discharge line to the ambient atmosphere when the pressure of the air exceeds a predetermined pressure. Conventional pressure relief valves are commonly referred to as "pop-off" valves because the valve opens suddenly when the predetermined pressure is exceeded. However, there are at least two common characteristics of conventional pop-off valves that can cause serious problems during a pneumatic offload of a dry bulk good from a tank truck. First, because the valve opens suddenly, a large volume of air is rapidly vented from the discharge line to the ambient atmosphere. The rapid loss of a large volume of air causes the air pressure in the discharge line to drop significantly and quickly. As a result, the discharge line is susceptible to becoming plugged with the product. As previously mentioned, a discharge line that becomes plugged with product requires manpower and is time consuming to clear, thereby resulting in increased operating costs to the manufacturer and the customer, along with a corresponding loss of productivity.

Second, conventional pop-off valves are activated mechanically, and therefore, are not particularly accurate. As a result, the pop-off valve does not always open at a pressure that is sufficiently close to the predetermined pressure. The pop-off valve may open when the air pressure in the discharge line is actually less than the predetermined pressure, thereby resulting in a slower offload or a discharge line that becomes plugged with the product. In both instances, the manufacturer and the customer suffer increased operating costs, along with a corresponding loss of productivity. Conversely, the pop-off valve may not open until the pressure in the discharge line is actually greater than the predetermined pressure, thereby resulting in damage to the blower and the unnecessary expense and loss of productivity suffered to remove and replace the blower. Although adjustable pop-off relief valves are commercially available, they have a limited adjustment, and furthermore, cannot be readily or accurately adjusted in the field. Pressure control systems of the type commonly used in industrial manufacturing and laboratory environments utilize more accurate, electronically and mechanically activated pressure relief valves. However, the more accurate pressure relief valves currently available are not cost effective, reliable or durable enough for use in the field, and in particular, on a tank truck.

Presently, there is no commercially available pressure control system for accurately controlling the pressure of the air in a discharge line during a pneumatic offload, and in particular, during a pneumatic offload of a dry bulk good from a tank truck. Furthermore, there is no commercially available pressure control system for accurately controlling the pressure of the air in a discharge line during a pneumatic offload that is cost effective, reliable and durable enough for use in the field. Still further, there is no commercially available pressure control system for accurately controlling the pressure of the air in a discharge line during a pneumatic offload that can be automatically activated and initialized from a remote location.

Thus, it is apparent that there exists a specific need for a pressure control system for accurately controlling the pressure of the air in a discharge line during a pneumatic offload, and in particular, during a pneumatic offload of a dry bulk good from a tank truck. It is further apparent that there is a specific need for a pressure control system for accurately controlling the pressure of the air in a discharge line during a pneumatic offload that is cost effective, reliable and durable. It is further apparent that there exists a specific need for a pressure control system for accurately controlling the pressure of the air in a discharge line during a pneumatic offload that can be automatically activated and initialized from a remote location, for example from the cab of a tank truck or from a remote operating station via a satellite downlink.

SUMMARY OF THE OBJECTS OF THE INVENTION

Therefore, it is a principle object of the present invention to provide a pressure control system for accurately controlling the pressure of the air in a discharge line during a pneumatic offload.

It is a more particular object of the invention to provide a pressure control system for accurately controlling the pressure of the air in a discharge line during a pneumatic offload of a dry bulk good from a tank truck.

It is a further object of the present invention to provide a pressure control system for accurately controlling the pressure of the air in a discharge line during a pneumatic offload of a dry bulk good from a tank truck that is cost effective to install and operate, and is reliable and durable enough for use in the field on a tank truck.

It is a further object of the present invention to provide a pressure control system for accurately controlling the pressure of the air in a discharge line during a pneumatic offload that can be automatically activated and initialized from a remote location.

It is a more particular object of the invention to provide a pressure control system for accurately controlling the air pressure in a discharge line during a pneumatic offload of a dry bulk good from a tank truck that can be automatically activated and initialized from the cab of the tank truck or from a remote operating station via a satellite downlink.

SUMMARY OF THE INVENTION

The invention is a pressure control system for accurately controlling the pressure of the air in a discharge line during a pneumatic offload. More specifically, the invention is a pressure control system for accurately controlling the pressure of the air in a discharge line during a pneumatic offload of a dry bulk good from a tank truck. The pressure control system includes a supply of pressurized air, a blower in fluid communication with the ambient atmosphere and with the discharge line and a pressure relief valve in fluid communication with the supply of pressurized air and with the discharge line. Preferably, the blower of the pressure control system is operatively coupled to a power take off (PTO) from the engine of the tank truck. Furthermore, the pressure control system includes a breakover valve in fluid communication with the supply of pressurized air and with the pressure relief valve. The breakover valve is operatively positioned downstream of the supply of pressurized air and upstream of the pressure relief valve. Accordingly, the breakover valve prevents fluid communication between the supply of pressurized air and the pressure relief valve when the pressure of the supply of pressurized air is less than a predetermined minimum pressure required to operate the air brake system of the tank truck. The pressure relief valve is operatively positioned in the discharge line downstream of the blower. Thus, the pressure relief valve vents the air in the discharge line to the ambient atmosphere when the pressure of the air in the discharge line exceeds the pressure of the supply of pressurized air.

In the preferred embodiment, the pressure relief valve of the pressure control system includes a generally hollow valve body defining a valve chamber. The valve body has a first inlet port formed therein, a second inlet port formed therein and at least one outlet port formed therein. The pressure relief valve further includes a valve positioned within the valve chamber of the valve body and a valve seat is positioned opposite the valve for sealing engagement with the valve. The pressure of the supply of pressurized air biases the valve in the direction of the valve seat. Accordingly, the pressure relief valve vents the air in the discharge line to the ambient atmosphere through the first inlet port, the valve chamber and the outlet port when the pressure of the air in the discharge line exceeds the pressure of the supply of pressurized air biasing the valve in the direction of the valve seat. The pressure relief valve may further include a valve spring having a predetermined spring setting. The valve spring is positioned under compression within the valve chamber between the valve and the second inlet port for biasing the valve in the direction of the valve seat. Thus, the pressure relief valve vents the air in the discharge line to the ambient atmosphere through the first inlet port, the valve chamber and the outlet port when the pressure of the air in the discharge line exceeds the predetermined spring setting of the valve spring.

Preferably, the pressure control system further includes a first pressure regulator in fluid communication with the supply of pressurized air and with the pressure relief valve. The first pressure regulator is operatively positioned downstream of the supply of pressurized air and upstream of the pressure relief valve. The first pressure regulator regulates the pressure of the supply of pressurized air to a first preselected pressure. The first preselected pressure biases the pressure relief valve in the closed position. Thus, the pressure relief valve vents the air in the discharge line to the ambient atmosphere when the pressure of the air in the discharge line exceeds the first preselected pressure. In another preferred embodiment, the pressure control system further includes a second pressure regulator in fluid communication with the first pressure regulator and with the pressure relief valve. The second pressure regulator is operatively positioned downstream of the first pressure regulator and upstream of the pressure relief valve and a solenoid valve is provided between the first pressure regulator and the second pressure regulator for engaging and bypassing the second pressure regulator. The second pressure regulator regulates the first preselected pressure to a second preselected pressure. The second preselected pressure biases the pressure relief valve in the closed position. Thus, the pressure relief valve vents the air in the discharge line to the ambient atmosphere when the pressure of the air in the discharge line exceeds the second preselected pressure.

In the preferred embodiment, a controller is electrically connected to the power take off (PTO) via a pneumatic switch and is further electrically connected to the solenoid.

A temperature probe may be operatively positioned in the discharge line downstream of the blower for recording and reporting the temperature of the air in the discharge line and the controller may include a display for displaying the temperature recorded by the temperature probe. A vacuum probe may be positioned on the inlet side of the blower in addition to or in place of the temperature probe. The vacuum probe records and reports the negative pressure on the inlet side of the blower relative to the pressure of the air in the discharge line in the vicinity of the pressure relief valve. The display of the controller may likewise be configured to display the vacuum recorded by the vacuum probe. Similarly, the pressure control system may include an RPM sensor for recording and reporting the operating speed of the engine of the tank truck or the operating speed of the blower, an altimeter, manometer or barometer for recording and reporting the altitude of the tank truck relative to sea level at the time of the pneumatic offload, or an anemometer for recording and reporting the velocity of the air in the discharge line, and thus, the rate of flow of the product. Preferably, the controller is located in the cab of the tank truck remote from the supply of pressurized air, the blower and the pressure relief valve. The controller further preferably includes a relay for receiving an electrical command signal from a satellite downlink or other wireless communication system.

BRIEF DESCRIPTION OF THE DRAWINGS

The aforementioned objects, and others, will be better understood and appreciated when considered in conjunction with the accompanying drawings in which like reference numerals indicate like parts.

DETAILED DESCRIPTION OF THE PREFERRED EMBODIMENTS

Figure 1:
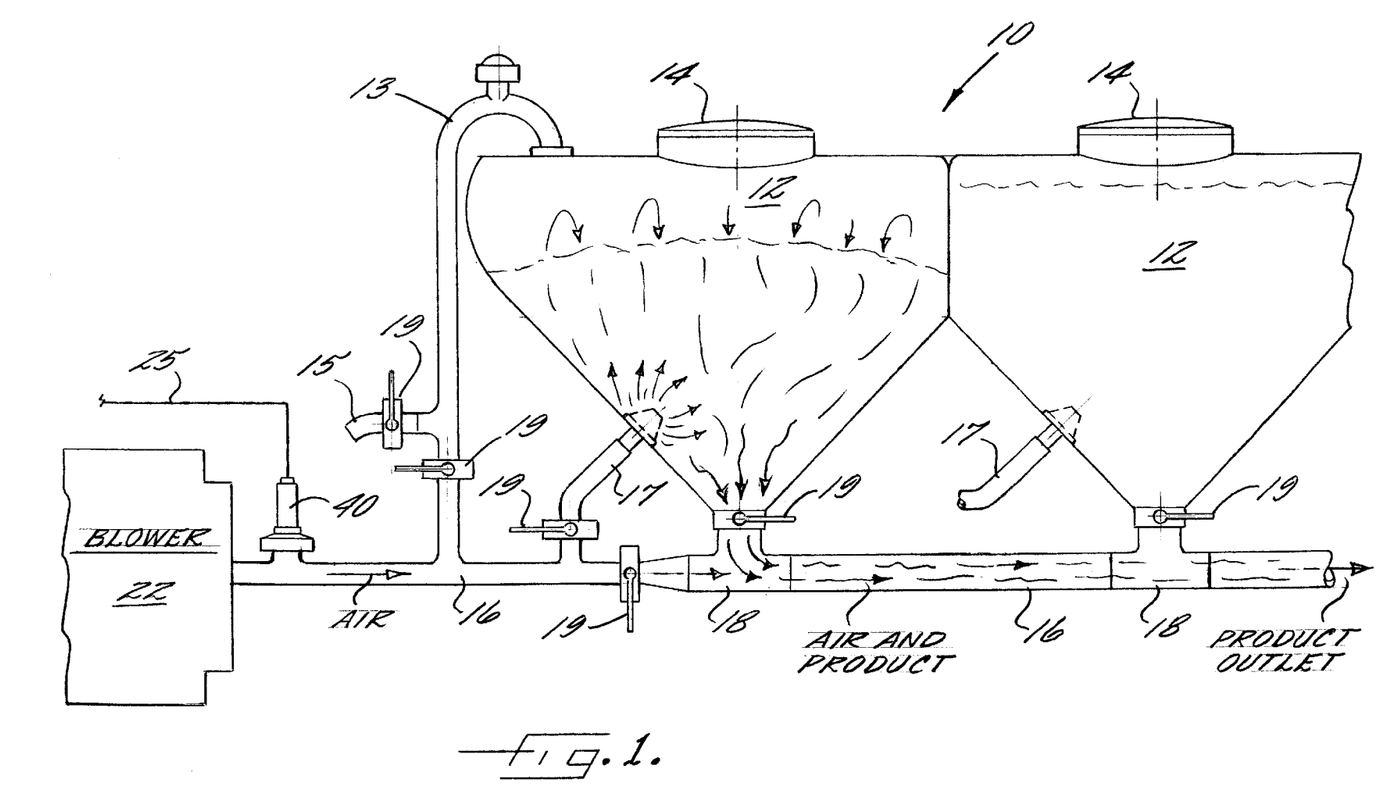
FIG. 1 is a side elevation view of a tank truck for transporting a dry bulk good, such as cement powder or plastic pellets, and for offloading the dry bulk good from the tank of the tank truck utilizing a pneumatic offload process.

FIG. 1 illustrates a tank truck, indicated generally at 10, for transporting a dry bulk good, for example cement powder or plastic pellets, from a manufacturing facility to a customer of the dry bulk good. Typically, the tank truck 10 delivers the dry bulk good, also referred to herein as the product, to a warehouse or to a silo operated by the customer. The product is loaded into one or more tanks 12 of the tank truck 10 through an opening 14 provided in the top of the tank 12. Alternatively, an external pneumatic load line (not shown) may be used to load the dry bulk good into the tank 12 through a pneumatic fill port provided in the outer wall of the tank 12. Once the tank truck 10 arrives at the destination, the dry bulk good is unloaded from the tank 12 through a discharge line 16 attached to a coupler 18 provided on the underside of the tank 12. The discharge line 16 is pressurized with air to initiate, facilitate and expedite offloading the dry bulk good from the tank 12 of the tank truck 10. Preferably, as will be described, the discharge line 16 is pressurized by a blower 22 that directs ambient air into the discharge line 16. The blower 22 may also pressurize the tank 12 by directing ambient air into the tank 12 through a top line 13 and may also aerate the product by directing ambient air into the tank 12 through an aerator line 17 in a known manner. A blow down line 15 may also be provided to vent the air in the tank 12 to the ambient atmosphere. Conventional flow valves 19 are also provided to open and close the discharge line 16, the top line 13, the blow down line 15, the aerator line 17 and the coupler 18.

The optimum pressure of the air in the discharge line 16 to minimize the time required to complete the pneumatic offload process depends on a number of variables, including the operating speed of the blower 22, the temperature of the air in the discharge line 16, the altitude of the tank truck 10 at the time of the pneumatic offload, the type of product, and the velocity of the air in the discharge line 16 (i.e., the flow rate of the product). Once the optimum pressure of the air in the discharge line 16 for the particular product transported by the tank truck 10 is determined, the operator of the tank truck 10 must continuously monitor one or more external pressure gauges to insure that the optimum pressure is maintained. If the pressure of the air in the discharge line 16 is less than the optimum pressure for the operating conditions at the time of discharge, the time required to offload the product may be unacceptably extended or the discharge line 16 may become plugged with the product. If the pressure of the air in the discharge line 16 is greater than the optimum pressure, the back pressure in the discharge line 16 may severely damage the blower 22. Furthermore, the product may be damaged if the temperature of the air in the discharge line 16 becomes excessive. Accordingly, it is desirable to accurately control the pressure of the air in the discharge line 16 during a pneumatic offload of the dry bulk good from the tank truck 10. It is further desirable to automatically activate and initialize the pressure control system from a remote location, as will be described.

Figure 2:
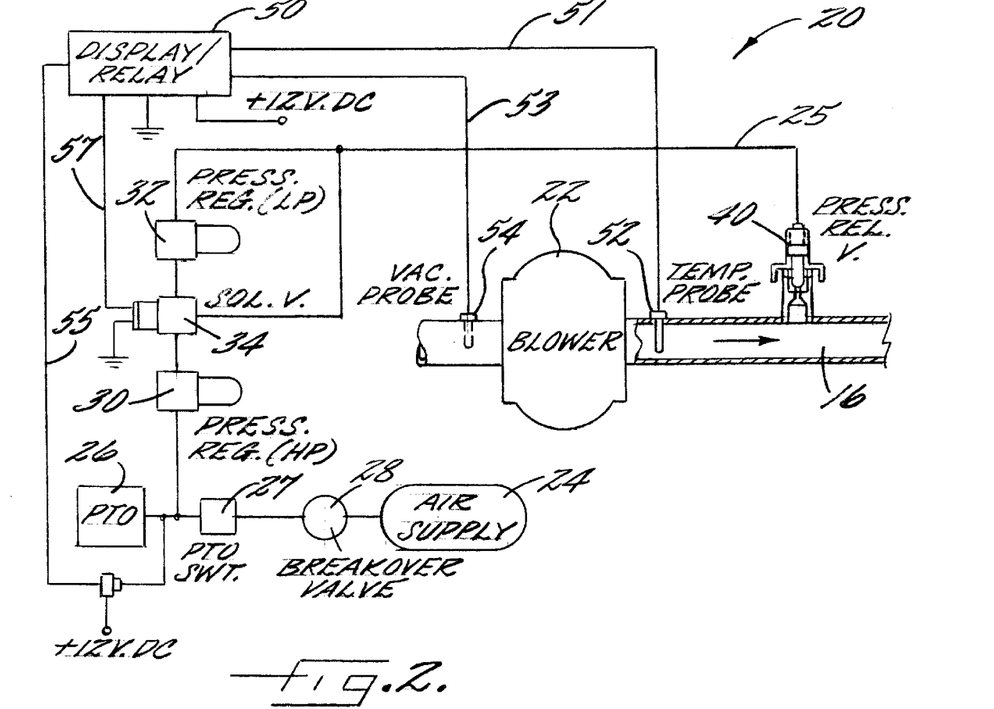
FIG. 2 is a schematic diagram of a pressure control system according to the present invention for controlling the pressure of the air in the discharge line during a pneumatic offload of a dry bulk good from the tank truck of FIG. 1.

The present invention provides a pressure control system, indicated generally at 20 in FIG. 2, for accurately controlling the pressure of the air in the discharge line 16. In addition, the invention provides a pressure control system 20 including means for automatically activating and initializing the pressure control system 20 from a remote location, such as from the cab of the tank truck 10 or a from a remote operating station via a satellite downlink. In the preferred embodiments of the invention described and illustrated herein, the pressure control system 20 comprises a blower 22, a supply of pressurized air 24 and a modified pressure relief valve 40. The pressure control system 20 may further comprise a breakover valve 28, two or more pressure regulators 30, 32 and at least one solenoid valve 34 for regulating the pressure of the air from the supply of pressurized air 24. In a preferred embodiment, the pressure control system 20 further comprises a controller 50 for automatically activating and initializing the pressure control system 20 during the pneumatic offload of the dry bulk good from the tank truck 10. The pressure control system 20 may further comprise at least one sensor, such as a temperature probe 52 for recording and reporting the temperature of the air in the discharge line 16. Similarly, the pressure control system 20 may further comprise a vacuum probe 54 for recording and reporting the difference in pressure between the air in the discharge line in the vicinity of the pressure relief valve 40 and the air in the discharge line on the inlet side of the blower 22. Similarly, the pressure control system 20 may further comprise an RPM sensor (not shown) for recording and reporting the operating speed of the engine of the tank truck 10 or the operating speed of the blower 22. Similarly, the pressure control system 20 may further comprise an altimeter, manometer or barometer (not shown) for recording and reporting the altitude of the tank truck 10 relative to sea level at the time of the pneumatic offload. Similarly, the pressure control system 20 may further comprise an anemometer for recording and reporting the velocity of the air in the discharge line 16, and thus, the rate of flow of the product through the discharge line 16.

The blower 22 is positioned between the cab of the tank truck 10 and the tank 12 and is in fluid communication with the ambient atmosphere and the discharge line 16. Preferably, the blower 22 is operatively coupled to the power take-off (PTO) 26 and a PTO switch 27 is provided to operatively couple and uncouple the blower 22 and the PTO 26. The blower 22 typically draws air from the ambient atmosphere through a filter (not shown) and directs the filtered ambient air into the discharge line 16, the top line 13, the blow down line 15 and/or the aerator line 17, as required. If desired, the tank 12 can be pressurized with the ambient air from the blower 22 by opening the flow valve 19 in the top line 13 so that the tank 12 is in fluid communication with the blower 22 through the discharge line 16 and the top line 13. If necessary, the tank 12 can be vented to the ambient atmosphere by closing the flow valve 19 in the top line 13 and opening the flow valve 19 in the blow down line 15 so that the tank 12 is in fluid communication with the ambient atmosphere through the top line 13 and the blow down line 15. The product in the tank 12 can also be aerated by opening the flow valve 19 in the aerator line 17 so that the tank 12 is in fluid communication with the blower 22 through the discharge line 16 and the aerator line 17. Finally, the discharge line 16 can be pressurized with the air from the blower 22 by opening the flow valve 19 in the discharge line 16 so that the discharge line 16 is in fluid communication with the blower 22. The product can then be offloaded through the discharge line 16 by opening the flow valve 19 in the coupler 18 on the underside of the tank 12. As previously mentioned, the tank truck 10 may comprise more than one tank 12 so that the product is separated into multiple compartments to facilitate and expedite the pneumatic offload process. The different tanks 12 may operate in parallel using separate discharge lines 16, top lines 13, blow down lines 15, aerator lines 17, couplers 18 and flow valves 19. Preferably, however, the tanks 12 are connected in series and utilize a common discharge line 16, a common top line 13, a common blow down line 15 and a common aerator line 17, as shown in FIG. 1.

The supply of pressurized air 24 may be an external air supply, but preferably, is the air supply provided on the tank truck 10 for providing pressurized air to the air brake system of the tank truck 10. The supply of pressurized air 24 is also in fluid communication with the pressure relief valve 40 through an air supply line 25 for a purpose to be described in greater detail hereinafter. The supply of pressurized air 24 is operatively coupled to the PTO 26 of the tank truck 10. The PTO switch 27 operatively couples and uncouples the compressor of the supply of pressurized air and the PTO 26 so that the compressor pressurizes the supply of pressurized air 24 while the engine of the tank truck 10 is running in a known manner. A breakover valve 28 is typically provided in fluid communication with the supply of pressurized air 24 and the pressure relief valve 40. The breakover valve 28 is positioned within the air supply line 25 downstream of the supply of pressurized air 24 and upstream of the pressure relief valve 40 to prevent the supply of pressurized air 24 from being available unless and until the pressure of the air in the supply of pressurized air 24 is greater than a predetermined minimum pressure. In particular, the supply of pressurized air 24 is not available to the pressure control system 20 unless there is sufficient air pressure in the supply of pressurized air 24 to safely operate the air brake system of the tank truck 10.

Figure 3:
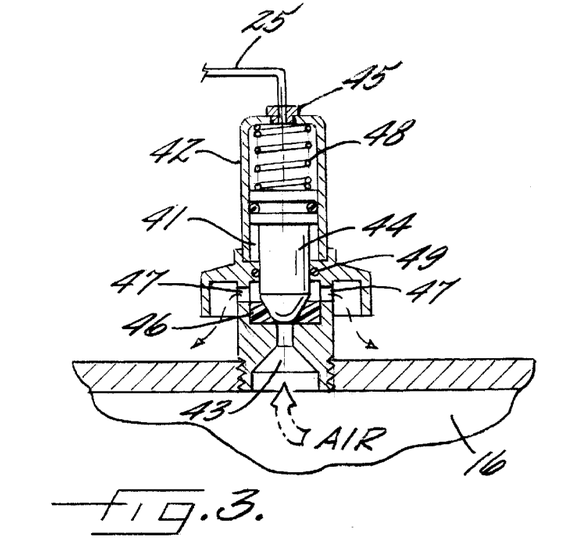
FIG. 3 is a cross-sectional view of a preferred embodiment of a pressure relief valve for use in conjunction with the pressure control system of FIG. 2.

The pressure relief valve 40 is positioned in the discharge line 16 downstream of the blower 22 and upstream of the coupler 18 of the tank 12 such that the pressure relief valve 40 is in fluid communication with the discharge line 16. As best shown in FIG. 3, the pressure relief valve 40 comprises a generally hollow valve body 42 defining a valve chamber 41, a smooth operating poppet (or other style i.e., spool) valve 44 positioned within the valve chamber 41, a valve seat 46 positioned opposite the poppet valve 44 for sealing engagement therewith and a valve spring 48 having a predetermined spring setting. The valve body 42 has a first inlet port 43 formed therein adjacent the discharge line 16 and a second inlet port 45 formed therein adjacent the distal end of the valve spring 48. The valve spring 48 is positioned within the valve chamber 41 under slight compression between the poppet valve 44 and the second inlet port 45. Thus, the valve spring 48 biases the poppet valve 44 in the direction of the valve seat 46 to maintain the pressure relief valve 40 in the closed position. The pressure relief valve 40 operates in a conventional manner with the exception that the second inlet port 45 receives the air supply line 25 from the supply of pressurized air 24 so that the pressure relief valve 40 is in fluid communication with the supply of pressurized air 24 as well as the discharge line 16. As a result, the poppet valve 44 is further biased in the direction of the valve seat 46 by the pressure of the supply of pressurized air 24. The poppet valve 44 remains in sealing engagement with the valve seat 46 (i.e., the pressure relief valve 40 remains in the closed position) until the force created by the pressure of the air in the discharge line 16 acting against the underside of the poppet valve 44 exceeds the opposing force created by the pressure of the supply of pressurized air 24 on the top of the poppet valve 44, in which case the poppet valve 44 is forced out of sealing engagement with the valve seat 46.

The pressure relief valve 40 further comprises at least one outlet port 47 formed in the valve body 42 of the pressure relief valve 40. Preferably, the at least one outlet port 47 extends radially outwardly from the valve body 42 adjacent the valve seat 46 such that the lower portion of the valve chamber 41 is in fluid communication with the ambient atmosphere. At the same time, the upper portion of the valve chamber 41 is filled with air from the supply of pressurized air 24 through the air supply line 25 and is sealed from the lower portion of the valve chamber 41 by an annular O-ring seal 49. When the poppet valve 44 is not in sealing engagement with the valve seat 46 (i.e., the pressure relief valve 40 is in the open position) the discharge line 16 is in fluid communication with the ambient atmosphere through the first inlet port 43, the lower portion of the valve chamber 41 and the at least one outlet port 47. As a result, the pressure relief valve 40 vents the air in the discharge line 16 to the ambient atmosphere through the first inlet port 43, the lower portion of the valve chamber 41 and the at least one outlet port 47 until the pressure in the discharge line 16 and the pressure of the supply of pressurized air 24 in the upper portion of the valve chamber 41 equalize. Once the force created by the pressure of the air in the discharge line 16 acting against the underside of the poppet valve 44 is less than the opposing force created by the pressure of the supply of pressurized air 24, the poppet valve 44 again moves into sealing engagement with the valve seat 46 (i.e., the pressure relief valve 40 is in the closed position).

It is believed that the combination of the smooth operating poppet valve 44 and the presence of the constant pressure of the supply of pressurized air 24 behind the poppet valve 44 permits the pressure relief valve 40 to open slowly in response to the pressure of the air in the discharge line 16. In this manner, the supply of pressurized air 24 modulates the pressure of the air in the discharge line 16 and the speed at which the pressure relief valve 40 opens. Specifically, the supply of pressurized air 24 prevents the poppet valve 44 of the pressure relief valve 40 from opening suddenly and causing a rapid loss of a large volume of air from the discharge line 16. Accordingly, the pressure of the air in the discharge line 16 remains at or substantially near the optimum pressure for offloading the particular product from the tank 12 of the tank truck 10. Obviously, the valve spring 48 may be eliminated from the pressure relief valve 40 as long as the supply of pressurized air 24 biases the poppet valve 44 in the direction of the valve seat 46. However, it is anticipated that the valve spring 48 will prevent the poppet valve 44 of the pressure relief valve 40 from chattering as the product is being transported by the tank truck 10 and the pressure of the air in the discharge line 16 is negligible. Furthermore, if the supply of pressurized air 24 is not available to the pressure relief valve 40, for example in the event that the air supply line 25 is inadvertently disconnected, the valve spring 48 will maintain the pressure relief valve 40 in the closed position until the pressure of the air in the discharge line 16 exceeds the predetermined setting of the valve spring 48. Thus, there will always be at least a minimal amount of pressure in the discharge line 16 to permit the pneumatic offload process to continue and to prevent the product from plugging the discharge line 16.

As previously mentioned, the breakover valve 28 prevents the supply of pressurized air 24 from being available to the pressure relief valve 40 unless the pressure of the supply of pressurized air 24 is greater than the pressure required to safely operate the air brake system of the tank truck 10. Typically, the air brake system of the tank truck 10 requires at least 60 pounds per square inch of pressure from the supply of pressurized air 24 to operate safely. However, 60 pounds per square inch pressure in the discharge line 16 can severely damage the blower 22. Thus, the pressure of the air from the supply of pressurized air 24 typically must be regulated to a lower pressure. As previously mentioned the optimum pressure for offloading the product from the tank 12 varies significantly for different products. Under certain circumstances, the operator of the tank truck 12 may transport different products on different occasions using the same tank truck 10. For example, the tank truck 10 may be utilized to transport cement powder on one occasion and plastic pellets on yet another occasion. Cement powder is relatively fine, and thus, extremely dense. In contrast, plastic pellets are relatively course, and thus, significantly less dense. As a result, the pressure of the air in the discharge line 16 required to move the cement powder through the discharge line 16 is significantly greater than the pressure required to move the plastic pellets through the same discharge line 16.

In the preferred embodiment illustrated schematically in FIG. 2, the pressure control system 20 further comprises a first pressure regulator 30 in fluid communication with the supply of pressurized air 24 and the pressure relief valve 40. The first pressure regulator 30 is positioned within the air supply line 25 downstream of the supply of pressurized air 24 and upstream of the pressure relief valve 40. The first pressure regulator 30 regulates the pressure of the supply of pressurized air 24 in a known manner to a first preselected pressure that is less than the pressure of the supply of pressurized air 24. For example, the first pressure regulator 30 may regulate the pressure of the supply of pressurized air 24 to the pressure required to move the cement powder through the discharge line 16, typically about 25 pounds per square inch. As a result, the first preselected pressure biases the poppet valve 44 in the direction of the valve seat 46 to maintain the pressure relief valve 40 in the closed position. Accordingly, the pressure relief valve 40 vents the air in the discharge line 16 to the ambient atmosphere through the first inlet port 43, the lower portion of the valve chamber 41 and the at least one outlet port 47 when the pressure of the air in the discharge line 16 exceeds the first preselected pressure.

The pressure control system 20 further comprises a second pressure regulator 32 in fluid communication with the first pressure regulator 30 and the pressure relief valve 40. The second pressure regulator 33 is positioned within the air supply line 25 downstream of the first pressure regulator 30 and upstream of the pressure relief valve 40. The second pressure regulator 32 regulates the pressure of the supply of pressurized air 24 in a known manner to a second preselected pressure that is less than the first preselected pressure. For example, the second pressure regulator 32 may regulate the pressure of the supply of pressurized air 24 to the pressure required to move the plastic pellets through the discharge line 16, typically about 12 pounds per square inch. As a result, the second preselected pressure biases the poppet valve 44 in the direction of the valve seat 46 to maintain the pressure relief valve 40 in the closed position. Accordingly, the pressure relief valve 40 vents the air in the discharge line 16 to the ambient atmosphere through the first inlet port 43, the lower portion of the valve chamber 41 and the at least one outlet port 47 when the pressure of the air in the discharge line 16 exceeds the second preselected pressure.

A solenoid valve 34 is positioned within the air supply line 25 between the first pressure regulator 30 and the second pressure regulator 32 for engaging or bypassing the second pressure regulator 30. Accordingly, the operator of the tank truck 10 can select the first preselected pressure or the second preselected pressure as required to offload the particular product. In addition, the predetermined spring setting of the valve spring 48 of the pressure relief valve 40 may provide a third preselected pressure less than the first preselected pressure and the second preselected pressure that is equivalent to the pressure required to move a third product through the discharge line 16. In other instances the operator of the tank truck 10 may, for example, transport the same product to destinations at significantly different altitudes. In such an instance, the operator must adjust the optimum pressure of the air in the discharge line 16 for the pneumatic offload process to account for the pressure of the ambient air at the particular altitude. It will be readily appreciated by those skilled in the art that any number of pressure regulators (n) and solenoid valves (n−1) may be employed to further regulate the pressure of the supply of pressurized air 24. Thus, it is entirely possible for the pressure control system 20 described herein to comprise a sufficient number of pressure regulators and solenoid valves to permit the operator to select a preselected pressure to pneumatically offload any number of different products through the discharge line 16 or to account for the pressure of the ambient air at any number of different altitudes. In the event that a plurality (n) of pressure regulators and a plurality (n−1) of solenoid valves is utilized, the pressure control system 20 further comprises conventional means for selecting the preselected pressure by directing the supply of pressurized air 24 to the appropriate pressure regulator through the corresponding solenoid valve so that the pressure of the air in the air supply line 25 is substantially equal to the preselected pressure.

In yet another preferred embodiment also illustrated schematically in FIG. 2, the pressure control system 20 further comprises a controller 50 and a sensor for recording and reporting data useful for further regulating the pressure of the air in the discharge line 16. As shown in FIG. 2, the sensor may, for example, be a temperature probe 52 or a vacuum probe 54. However, as will be described hereinafter, those skilled in the art will appreciate that any one of a number of other sensors may be utilized in place of or in addition to temperature probe 52 or vacuum probe 54. As shown in FIG. 2, the temperature probe 52 is operatively positioned within the discharge line 16 downstream of the blower 22. Alternatively, the temperature probe 52 can be positioned within the discharge line 16 further downstream of the blower 22 in the vicinity of the product stream for temperature sensitive products. The temperature probe 52 records the temperature of the air in the discharge line 16. The controller 50 is electrically connected to the temperature probe 52 through electrical line 51 for receiving an electrical signal from the temperature probe 52 that is proportional to the temperature of the air in the discharge line 16. Preferably, the controller 50 comprises a display for displaying the temperature recorded by the temperature probe 52. The vacuum probe 54 is operatively positioned within the discharge line 16 on the inlet side of the blower 22. The vacuum probe 54 records the vacuum (i.e., negative differential pressure) of the air in the discharge line 16 on the inlet side of the blower 22. The controller 50 is electrically connected to the vacuum probe 54 through electrical line 53 for receiving an electrical signal from the vacuum probe 54 that is proportional to the vacuum on the inlet side of the blower 22 recorded by the vacuum probe 54. Preferably, the controller 50 comprises a display for displaying the vacuum recorded by the temperature probe 52.

The controller 50 is also electrically connected to the PTO switch 27 of the PTO 26 of the tank truck 10 through an electrical line 55. When the PTO switch 27 is engaged, electrical line 55 transmits an electrical signal to the controller 50 and releases the supply of pressurized air 24 of the pressure control system 20, which in turn activates the blower 22. The controller 50 is also electrically connected to the solenoid valve 34 through an electrical line 57. Electrical line 57 transmits an electrical signal from the controller 50 to automatically engage or bypass the second pressure regulator 32 of the pressure control system 20. If the tank truck 10 repeatedly transports the same type of product, the pressure control system 20 may include a plug from the trailer to the tractor for transmitting an electrical signal to the controller 50. The controller 50 in turn transmits an electrical signal through electrical line 57 to the solenoid valve 34 so that the appropriate pressure regulator 30, 32, and thus the appropriate pressure in the air supply line 25, is automatically initialized.

As previously discussed, electrical line 57 may be utilized to transmit an electrical signal to engage any one of a number of pressure regulators in response to different products or different altitudes at which the pneumatic offload process is performed. In addition, electrical line 57 may be utilized to transmit an electrical signal to engage any one of a number of pressure regulators in response to a particular operating condition, such as the temperature of the air in the vicinity of the pressure relief valve 40, the vacuum of the air on the inlet side of the blower 22, the altitude of the tank truck 10 at the time of the pneumatic offload, the type of product being discharged, or the velocity of the air in the discharge line 16 (i.e., the flow rate of the product). Obviously, any of a number of conventional sensors may be utilized in place of or in addition to the temperature probe 52 and/or the vacuum probe 54 to record and report a particular operating condition to the controller 50. As examples, but without limitation, the pressure control system 20 may comprise an RPM sensor for recording and reporting engine and/or blower speed, an altimeter, manometer or barometer for recording and reporting altitude, a pressure probe for recording and reporting pressure in the discharge line downstream from the blower 22, or an anemometer for recording and reporting the velocity of the air in the discharge line 16. Any of the aforementioned sensors, alone or in combination may be used to regulate the pressure of the air in the discharge line 16 by automatically initializing the pressure of the air in air supply line 25, as previously described.

For example, the pressure relief valve 40 may be operated (i.e., opened and closed) in response to different engine operating speeds or blower operating speeds recorded and reported by an RPM sensor (not shown). Accordingly, the RPM sensor may be utilized to change the offload conditions for different products. Plastic pellets require a high air velocity in the discharge line 16 (i.e., airflow) and a low air pressure in the discharge line 16. Thus, the pressure relief valve 40 can be set to open at a lower pressure in response to a higher engine operating speed or a higher blower operating speed. In contrast, dry cement powder requires a low air velocity and a high air pressure in the discharge line 16. Thus, the pressure relief valve 40 can be set to open at a higher pressure in response to a lower engine operating speed or a lower blower operating speed. The RPM sensor protects the blower 22, the product and reduces fuel consumption because there presently is no suitable method for matching different pressure relief valve 40 settings to engine operating speed or blower operating speed. In another example, an altitude sensor (e.g., altimeter, manometer or barometer) may be utilized in conjunction with a pressure probe to limit the difference in the pressure of the air on the inlet side of the blower 22 and the pressure of the air in the vicinity of the pressure relief valve 40 when the tank truck 10 transports a dry bulk good from a manufacturer located in Los Angeles, Calif. to a customer located in Salt Lake City, Utah. Thus, the pressure relief valve 40 can be set to open at a higher pressure in response to a higher altitude. Similarly, an anemometer may be utilized to match different pressure relief valve 40 settings to the velocity of the air in the discharge line 16 required for different types of products.

Preferably, the controller 50 of the pressure control system 20 is located at a remote location from the blower 22, the supply of pressurized air 24 and the pressure relief valve 40. In this manner, the pressure control system 20 can be automatically activated by transmitting an electrical command signal through the electrical line 55 from the controller 50 to the PTO switch 27. Similarly, the pressure of the air in the air supply line 25 can be automatically initialized by transmitting an electrical command signal through the electrical supply line 57 from the controller 50 to the solenoid valve 34. For example, the controller 50 may be located in the cab of the tank truck 10 and may be preset with the preselected pressure for the particular product(s) transported by the tank truck 10. The controller 50 may further comprise a relay for relaying an electrical command signal received from a remote location. For example, the relay of the controller 50 may receive an electrical command signal from a remote operating station via a satellite downlink or other wireless communications system. The controller then transmits the electrical command signal through electrical line 55 to automatically activate the pressure control system 20 and through electrical line 57 to automatically initialize the pressure of the air in the air supply line 25.

From the foregoing, it should now be apparent that the present invention provides a pressure control system 20 for accurately controlling the pressure of the air in the discharge line 16 during a pneumatic offload process. In particular, the present invention provides a pressure control system 20 for accurately controlling the pressure of the air in the discharge line 16 during a pneumatic offload of a dry bulk good from the tank 12 of the tank truck 10. Furthermore, the present invention provides a pressure control system including means for automatically activating the pressure control system and for automatically initializing the preselected pressure of the air in the discharge line 16 from a remote location, such as from the cab of the tank truck 10 or from a remote operating station via a satellite downlink.

That which is claimed is:

1. A pressure control system for controlling the air pressure in a discharge line during a pneumatic offload of a dry bulk good from a tank truck, said pressure control system comprising
    a supply of pressurized air;
    a blower in fluid communication with the ambient atmosphere and with the discharge line, said blower operatively coupled to a power take off (PTO) from the engine of the tank truck;
    a pressure relief valve in fluid communication with said supply of pressurized air and with the discharge line, said pressure relief valve operatively positioned in the discharge line downstream of said blower; and
    a controller electrically connected to the power take off (PTO).

2. A pressure control system according to claim 1 wherein said controller is located in the cab of the tank truck remote from said supply of pressurized air, said blower and said pressure relief valve and wherein said controller further comprises a relay for receiving an electrical command signal from a satellite downlink.

3. A pressure control system according to claim 1 further comprising a breakover valve in fluid communication with said supply of pressurized air and with said pressure relief valve, said breakover valve operatively positioned downstream of said supply of pressurized air and upstream of said pressure relief valve, said breakover valve for preventing fluid communication between said supply of pressurized air and said pressure relief valve when the pressure of said supply of pressurized air is less than a predetermined minimum pressure required to operate the air brake system of the tank truck.

4. A pressure control system according to claim 1 further comprising a sensor electrically connected to said controller for recording and reporting an operating condition associated with the pneumatic offload and wherein said pressure relief valve vents the air in the discharge line to the ambient atmosphere in response to a predetermined value of the operating condition recorded by said sensor.

5. A pressure control system according to claim 4 wherein said sensor is selected from the group consisting of a temperature probe operatively positioned in the discharge line downstream of said blower for recording the temperature of the air in the discharge line, a vacuum probe electrically connected to said controller and operatively positioned in the discharge line on the inlet side of said blower for recording the vacuum of the air in the discharge line on the inlet side of said blower, an RPM sensor for recording and reporting the operating speed of the engine of the tank truck or the operating speed of said blower, an altimeter for recording and reporting the altitude of the tank truck at the time of the pneumatic offload or an anemometer for recording and reporting the velocity of the air in the discharge line.

6. A pressure control system according to claim 1 wherein said pressure relief valve comprises
    a generally hollow valve body defining a valve chamber, said valve body having a first inlet port formed therein, a second inlet port formed therein and at least one outlet port formed therein;
    a valve positioned within said valve chamber of said valve body opposite said valve seat; and
    a valve seat positioned opposite said valve for sealing engagement with said valve;
    wherein the pressure of said supply of pressurized air biases said valve in the direction of said valve seat; and
    wherein said pressure relief valve vents the air in the discharge line to the ambient atmosphere through said first inlet port, said valve chamber and said at least one outlet port when the force of the pressure of the air in the discharge line exceeds the force of the pressure of said supply of pressurized air.

7. A pressure control system according to claim 6
    wherein said pressure relief valve further comprises a valve spring having a predetermined spring setting, said valve spring positioned under compression within said valve chamber between said valve and said second inlet port for biasing said valve in the direction of said valve seat; and
    wherein said pressure relief valve vents the air in the discharge line to the ambient atmosphere through said first inlet port, said valve chamber and said at least one outlet port when the pressure of the air in the discharge line exceeds the predetermined spring setting of said valve spring.

8. A pressure control system according to claim 1 further comprising
- a first pressure regulator in fluid communication with said supply of pressurized air and with said pressure relief valve for regulating the pressure of said supply of pressurized air to a first preselected pressure, said first pressure regulator operatively positioned downstream of said supply of pressurized air and upstream of said pressure relief valve;
- wherein the first preselected pressure biases said pressure relief valve in the closed position; and
- wherein said pressure relief valve vents the air in the discharge line to the ambient atmosphere when the pressure of the air in the discharge line exceeds the first preselected pressure.

9. A pressure control system according to claim 8 further comprising
- a second pressure regulator in fluid communication with said first pressure regulator and with said pressure relief valve for regulating the first preselected pressure to a second preselected pressure, said second pressure regulator operatively positioned downstream of said first pressure regulator and upstream of said pressure relief valve; and
- a solenoid valve for engaging and bypassing said second pressure regulator;
- wherein the second preselected pressure biases said pressure relief valve in the closed position; and
- wherein said pressure relief valve vents the air in the discharge line to the ambient atmosphere when the pressure of the air in the discharge line exceeds the second preselected pressure.

* * * * *